United States Patent
Ferrer et al.

(10) Patent No.: US 11,827,274 B2
(45) Date of Patent: Nov. 28, 2023

(54) TURN PATH VISUALIZATION TO IMPROVE SPATIAL AND SITUATIONAL AWARENESS IN TURN MANEUVERS

(71) Applicant: Ford Global Technologies, LLC, Dearborn, MI (US)

(72) Inventors: John Michael Ferrer, Dearborn, MI (US); Jayanthi Rao, Dearborn, MI (US); Victoria Schein, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 382 days.

(21) Appl. No.: 16/976,900

(22) PCT Filed: Mar. 9, 2018

(86) PCT No.: PCT/US2018/021831
§ 371 (c)(1),
(2) Date: Aug. 31, 2020

(87) PCT Pub. No.: WO2019/172938
PCT Pub. Date: Sep. 12, 2019

(65) Prior Publication Data
US 2021/0039715 A1   Feb. 11, 2021

(51) Int. Cl.
*B62D 15/02* (2006.01)
*H04W 4/46* (2018.01)
(Continued)

(52) U.S. Cl.
CPC ......... *B62D 15/0295* (2013.01); *B60W 50/14* (2013.01); *G06V 20/58* (2022.01);
(Continued)

(58) Field of Classification Search
CPC ..... B62D 15/0295; H04W 4/46; G06V 20/58; B60W 50/14; B60W 2556/65;
(Continued)

(56) References Cited

U.S. PATENT DOCUMENTS

| | | |
|---|---|---|
| 2005/0137786 A1 | 6/2005 | Breed et al. |
| 2008/0211651 A1 | 9/2008 | Beutnagel-Buchner et al. |

(Continued)

OTHER PUBLICATIONS

International Search Report of the International Searching Authority for PCT/US2018/021831 dated May 30, 2018.

*Primary Examiner* — Behrang Badii
*Assistant Examiner* — Jay Khandpur
(74) *Attorney, Agent, or Firm* — Brandon Hicks; Eversheds Sutherland (US) LLP (57) ABSTRACT

Sensor data and data from V2V messages are used to detect obstacles. Additional obstacles are identified in map data according to a vehicle's position. In response to detecting a turn intent, a controller calculates a turn path according to the detected obstacles and properties of the vehicle. The turn path is presented to a user, such as by display on a HUD or superimposing the turn path on an image from a forward facing camera. A desired steering angle to traverse the turn path may be displayed, such as relative to the current steering angle of the vehicle. Notifications regarding the path and turning intent of other vehicle may be displayed along with the turn path.

12 Claims, 5 Drawing Sheets

(51) Int. Cl.
*B60W 50/14* (2020.01)
*G06V 20/58* (2022.01)
*B60W 50/00* (2006.01)

(52) U.S. Cl.
CPC ...... *H04W 4/46* (2018.02); *B60W 2050/0068* (2013.01); *B60W 2050/146* (2013.01); *B60W 2540/18* (2013.01); *B60W 2554/4045* (2020.02); *B60W 2556/65* (2020.02)

(58) Field of Classification Search
CPC ... B60W 2050/0068; B60W 2050/146; B60W 2540/18; B60W 2554/4045
See application file for complete search history.

(56) References Cited

U.S. PATENT DOCUMENTS

| | | | |
|---|---|---|---|
| 2014/0347470 A1* | 11/2014 | Zhang | G06T 3/4038 |
| | | | 382/104 |
| 2016/0325753 A1 | 11/2016 | Stein et al. | |
| 2017/0120804 A1* | 5/2017 | Kentley | B60Q 1/507 |
| 2017/0191850 A1* | 7/2017 | Augst | G01C 21/3697 |
| 2019/0047472 A1* | 2/2019 | Chaaya | G01S 13/931 |
| 2019/0202476 A1* | 7/2019 | Tao | B60W 30/095 |
| 2019/0256091 A1* | 8/2019 | Lepp | G08G 1/143 |
| 2020/0035102 A1* | 1/2020 | Satomura | G06V 20/582 |
| 2020/0117187 A1* | 4/2020 | Kothari | G06F 21/32 |
| 2020/0189583 A1* | 6/2020 | Tatourian | G06F 16/29 |
| 2020/0269877 A1* | 8/2020 | Mortazavi | G08G 1/0116 |
| 2020/0290588 A1* | 9/2020 | Källstrand | B62D 9/002 |

* cited by examiner

Fig. 5

TURN PATH VISUALIZATION TO IMPROVE SPATIAL AND SITUATIONAL AWARENESS IN TURN MANEUVERS

BACKGROUND

Field of the Invention

This invention relates to providing sensor-based driving aids.

Background of the Invention

Vehicles have become much safer over the decades. In addition to safety equipment that protect a passenger in the event of a crash, many vehicles offer sensors that can alert the driver of obstacles. However simply providing an alert may be distracting and may not be enough to induce a timely response from a driver.

Accordingly, what is needed is an improved approach for using sensor data to improve passenger safety.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
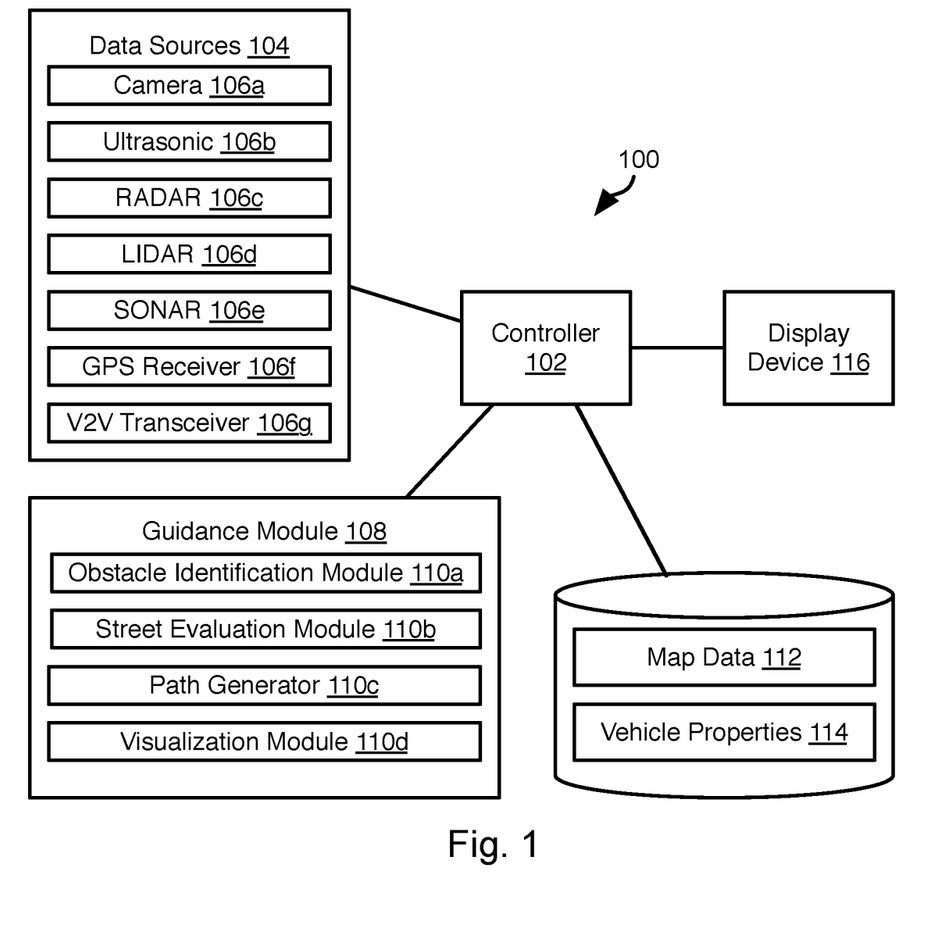
FIG. 1 is a schematic block diagram of components implementing a system in accordance with an embodiment of the present invention.

Referring to FIG. 1, the methods disclosed herein may be performed using the illustrated system 100. As discussed in greater detail herein, a controller 102 may be programmed to perform the methods disclosed herein and may also perform other functions performed by a vehicle controller (e.g., electronic control unit (ECU)) or in-vehicle infotainment (IVI). The controller 102 may be housed in a vehicle having the structures and features of any vehicle known in the art including, wheels, a drive train coupled to the wheels, an engine coupled to the drive train, a steering system, a braking system, and other systems known in the art to be included in a vehicle.

The controller 102 may receive one or more outputs from one or more data sources 104. For example, one or more cameras 106a may be mounted to the vehicle and output image streams to the controller 102. The data sources 104 may include sensors such as an ultrasonic sensor 106b, a RADAR (Radio Detection and Ranging) sensor 106c, a LIDAR (Light Detection and Ranging) sensor 106d, a SONAR (Sound Navigation and Ranging) sensor 106e, and the like.

Other sources 104 of data may include a GPS (global positioning system) receiver 106f and a vehicle-to-vehicle (V2V) transceiver 106g. The V2V transceiver may communicate with other vehicles according to a wireless protocol such as DSRC (dedicated short range communications) protocol.

The controller 102 may execute a guidance module 108 that receives the outputs of the data sources 104. The guidance module 108 may include an obstacle identification module 110a, a street evaluation module 110b, path generator 110c, and a visualization module 110d.

The obstacle identification module 110a analyzes the outputs of the data sources 104 and identifies potential obstacles, including people, animals, vehicles, buildings, curbs, and other objects and structures. In particular, the obstacle identification module 110a may identify vehicle images in the sensor outputs.

The street evaluation module 110b evaluates available driving surfaces and the limits or divisions of a driving surface, such as curbs and lane boundaries. The street evaluation module 110b may further evaluate map data 112 with respect to a GPS location from the GPS receiver 106f to identify some or all of this information. For example, the number of lanes, whether a particular lane is a turning lane, the width of a street, the width of lanes, the locations of intersections, and the like information may be recorded in map data 112, which may be related to the vehicle's current position as determined from the GPS receiver 106f.

Note that the lane boundaries and locations of curbs or other obstacles may also be determined from sensor data, such as the outputs of some or all of the sensors 106a-106e. For example, lane boundaries and/or curb locations may be compared with map data to confirm the accuracy of the sensors or to more accurately determine the relative location of the vehicle.

The path generator 110c may use the obstacle locations and street data from modules 110a, 110b in order to determine a path corresponding to driver intent. The approach disclosed herein is particularly helpful for drivers executing turning maneuvers such as U-turns, turns in heavy traffic, turns in a busy parking lot, turns in blind or narrow intersections, or other circumstances with low visibility. Accordingly, the driver intent may be an intent to make a turn. The path generator 110c may make use of vehicle properties 114 describing the vehicle to determine a path consistent with the driver intent and that also avoids obstacles and remains in an intended area of a street as detected by the street evaluation module 110b. The vehicle properties 114 may include static properties such as the vehicles width, length, wheelbase size, turning radius, and turning dynamics (body roll, tire grip, etc.). The vehicle properties 114 may also include variable properties such as current steering angle, current speed, the curvature of the turn indicated by the driver intent, or other vehicle properties.

The path generator 110c may identify the path according to any approach known in the art. In particular, the approach described herein provides guidance to a human driver. However, the path generated by the path generator 110c may be a path selected according to any autonomous navigation technique known in the art. In particular, a control algorithm such as may be used in an autonomous vehicle is programmed to select and execute a path for a given set of inputs, such as the obstacles and street data discussed above. Accordingly, a path may be generated according to such an algorithm for execution by a human driver.

The visualization module 110d may present the path on a display device 116, such as a heads up display (HUD) in front of the driver, such as by displaying information on the windshield of the vehicle. The display device 116 may also be a screen of an IVI (in-vehicle infotainment) system or a portion of a digital instrument cluster. The display device 116 may also provide other visual alerts and information to aid a driver in executing a turning maneuver.

Figure 2:
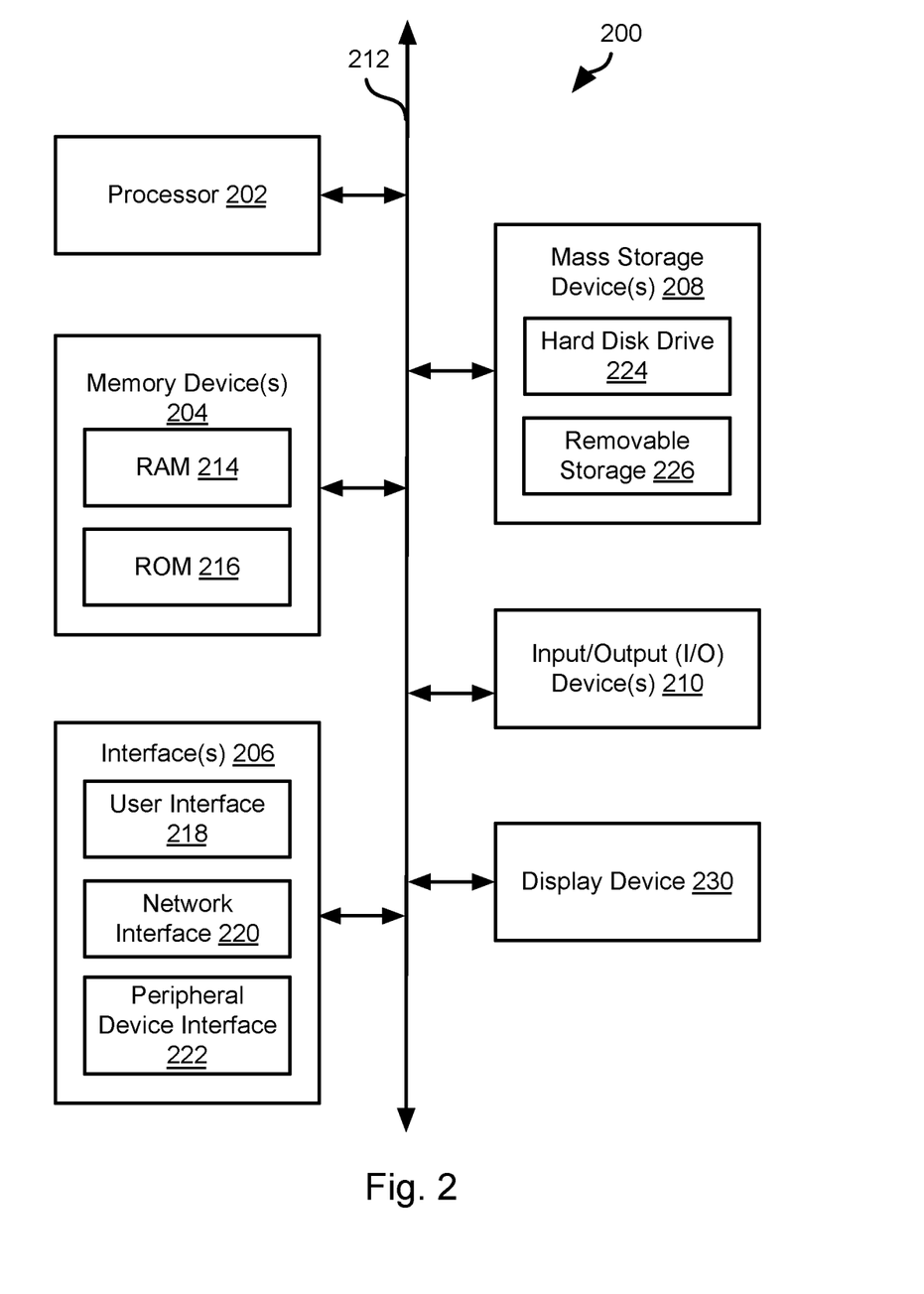
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The controller 102 may have some or all of the attributes of the computing device 200.

Computing device 200 includes one or more processor(s) 202, one or more memory device(s) 204, one or more interface(s) 206, one or more mass storage device(s) 208, one or more input/output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
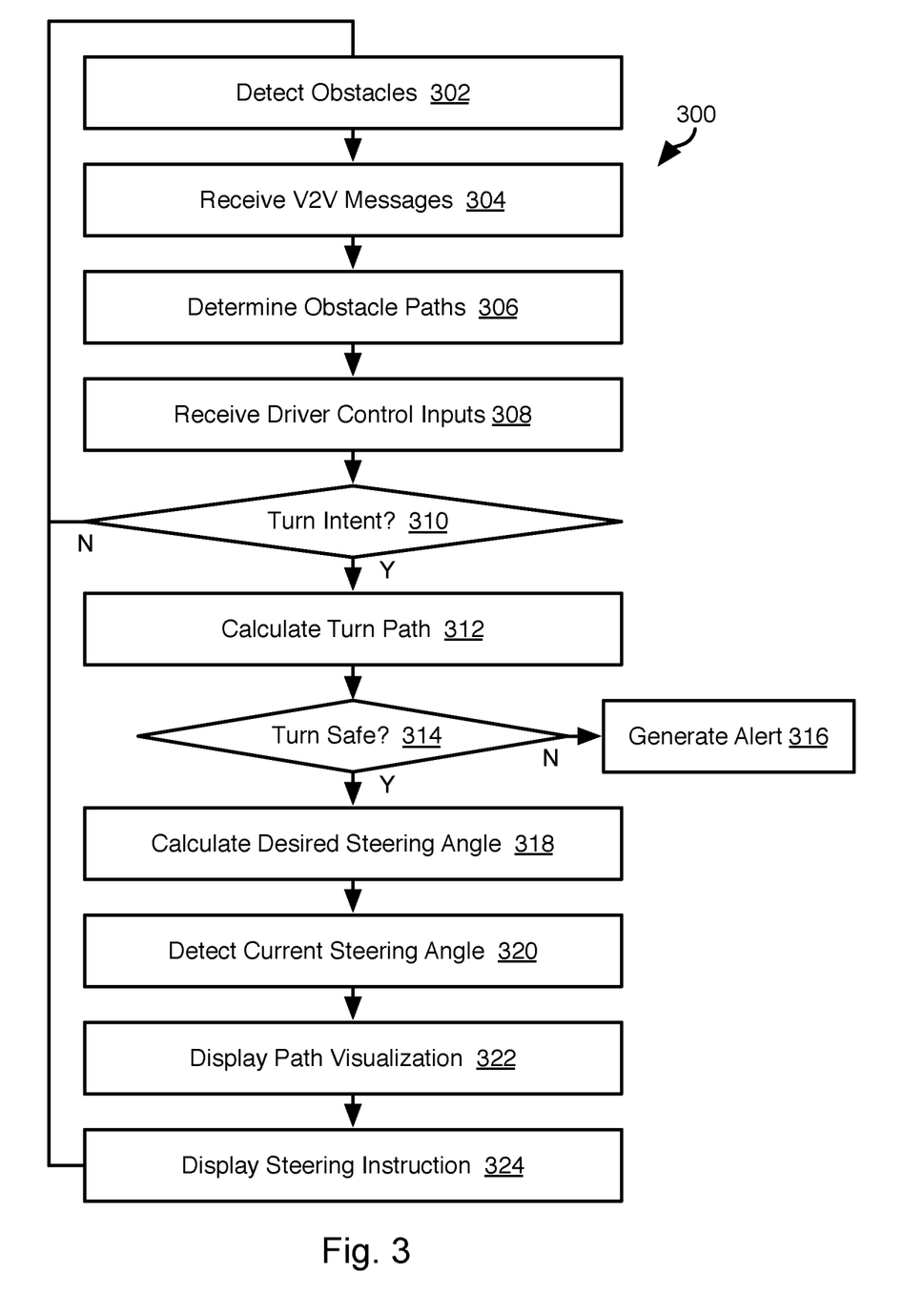
FIG. 3 is a process flow diagram of a method for providing turn guidance and visualization in accordance with embodiments of the present invention.

Referring to FIG. 3, the illustrated method 300 may be executed by the guidance module 108 of the controller 102 in order to provide assistance to a driver of the vehicle.

The method 300 may further include detecting 302 obstacles according to some or all of the data sources 104. For example, obstacles and the location therefore may be detected using outputs of the camera 106a, RADAR 106c, LIDAR 106d, or in map data based on the position of the vehicle according to the GPS receiver 106f In particular, the locations of curbs, lane boundaries, and street signs may be obtained from the map data based on the vehicle's current position.

The method 300 may further include receiving 304 messages from other vehicles using a V2V communication protocol. Such messages may include data indicating another vehicle's current location, direction, speed, steering angle, accelerator inputs, turn signal state, current gear (e.g., reverse or forward gear). Messages may further include data describing intended future actions and the location thereof (e.g., locations and directions of turns or other actions according to routing data currently being presented on the other vehicle) and locations of obstacles detected by the sensors of the other vehicle, or other information. Note that the vehicle housing the controller 102 may also transmit such messages to other vehicles using the V2V communication protocol.

The method 300 may further include determining 306 paths of obstacles detected at step 302 or as communicated by V2V messages at 304. For example, using locations of detected obstacles over time, the velocity of obstacles relative to the vehicle may be determined. Likewise, a path may be inferred according to the past determinations of position, such as using a Kalman filter or other object tracking technique. The manner in which obstacles are located, tracked, and corresponding paths are predicted may be according to any approach known in the art, such as any approach known in the art of autonomous vehicles.

The method 100 may include receiving 308 driver control inputs. Driver control inputs may include changes to a steering wheel angle, an accelerator pedal position, brake pedal position, or other driver input. Driver control inputs may further include turning on a turn signal. The driver control inputs may also include input of a destination with an instruction to the controller 102 or IVI system to navigate to that position. Accordingly, a route generated according to the driver input may include instructions to turn at particular locations and proceed along particular sections of a street.

Note that steps 302-308 are all processes that may be performed throughout a drive and may be performed concurrently by the controller 102 while the vehicle is in operation. Accordingly, the ordering of steps 302-308 in FIG. 3 is not restrictive. Likewise, steps 302-308 may continue to be performed throughout execution of the remaining steps of the method 300.

The method 300 may include evaluating 310 whether the driver inputs indicate an intent to turn. For example, an intent to turn may be detected in response to turning on a turn signal, an upcoming turn (e.g., within a threshold distance or time) according to routing data, a change in steering wheel angle toward a turning lane (e.g., left turn lane or right turn only lane), or other indication of an intent to turn. In some embodiments, only turns of a certain sharpness invoke turning aides according to the methods described below, such as only U-turns or only turns that require at least a 180-degree rotation of the steering wheel.

In response to detecting 310 the intent to turn, the method 300 may include calculating 312 a turn path in the direction and location indicated by the intent. For example, where turn signal is turned on, an upcoming turn may be identified in the map data 112 according to the vehicle's current location and the direction indicated by the turn signal (right or left). For example, where the right turn signal is turned on, the location of the next opportunity to turn right may be identified according to the map data and the vehicle's current position and speed, i.e. the next right turn that the vehicle could possibly make based on its current speed and the time required to safely slow down to a safe turning speed.

Where intent to turn is based on routing data, the location of the turn indicated by the routing data may be determined.

In either case, step 312 may include calculating a path that traverses the turn within limits of the vehicle's dynamic limits, avoids obstacles (including coinciding with a path of an obstacle at the same time), and other factors. In some embodiments, a lane into which the vehicle is to turn may be selected. Likewise, a path into another lane following the turn may be determined as well. The turn path may include a multi-step turn (e.g., three-point turn) in order to orient the vehicle in a desired direction. The path calculated at step 312 may be a U-turn or, where U-turn becomes unsafe, a maneuver to proceed to another turn-around location. Calculating a turn path may take into account some or all of the vehicle properties 114, particularly the wheelbase size and turning radius of the vehicle.

As noted above, calculating 312 the turn path may be performed using any approach for operating an autonomous vehicle except that the turn is not actually autonomously executed by the controller 102.

The method 300 may further include evaluating 314 whether a turn path exists that may be performed safely, i.e. does not have a high probability of colliding with an obstacle or exceeding the operational limits of the vehicle. If no safe turn path exists, the method 300 may include generating 316 an alert to the driver, such as in the form of an audible tone, visual warning, or an intervention, such as applying the brakes autonomously.

If a safe turn path is found 314 to exist, the method 318 may include calculating 318 a desired steering angle for the vehicle to follow the turn path. The desired steering angle may include detecting a desired orientation of the wheels in order to follow the turn path, such as according to any approach for autonomously driving a vehicle over a path as known in the art. The steering angle corresponding to the wheel angle may then be determined from the configuration of the steering system, i.e. a known relationship between steering wheel angle and steering angle. The method 300 may further include detecting 320 the current steering angle of the vehicle, such as using a steering angle sensor according to any approach known in the art.

The method 300 may further include displaying 322 a representation of the turn path and displaying a steering instruction 324 instructing the user to move the steering wheel from the current angle to the desired angle. Examples of how steps 322 and 324 may be performed are described below with respect to FIGS. 4 and 5.

Note that the steps of the method 300 may be repeated throughout a turn. For example, steps 312-324 may be performed repeatedly so long as turn intent is detected, i.e. until the vehicle has completed the turn, passed the opportunity to turn, the turn signal has been deactivated, or some other criteria. Accordingly, the path may be recalculated 312 and the displays of steps 322, 324 may be updated as the vehicle moves.

Note that steps 312-324 are dependent on a finding 310 of turn intent. Accordingly, where not turn intent is detected, the turning aides and other information may be suppressed in order to avoid distracting the driver and cluttering an HUD, IVI display, or other third party display device.

Figure 4:
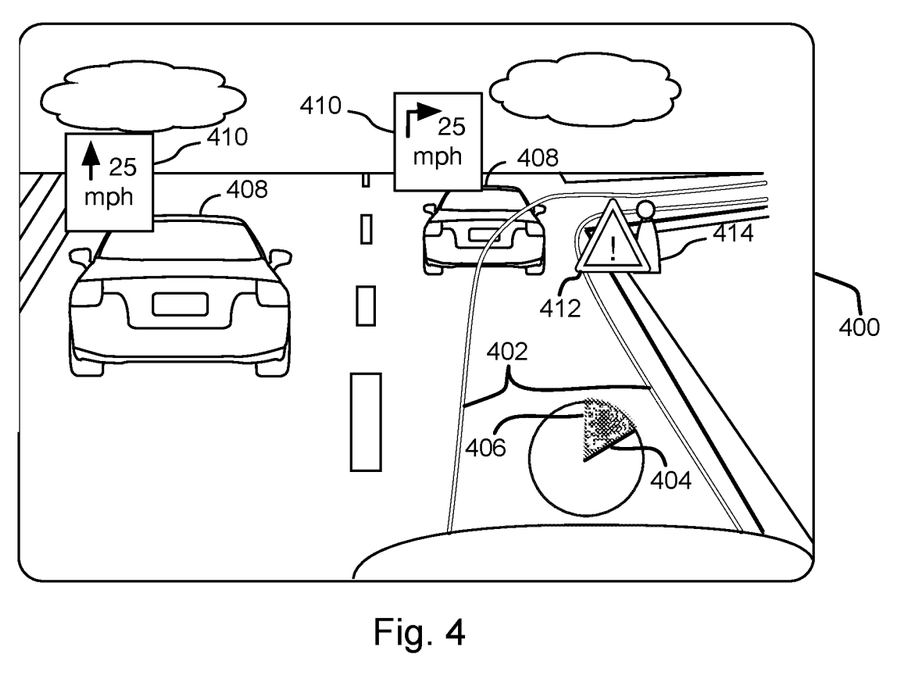
FIG. 4 illustrates an example display of turn visualization and guidance in accordance with an embodiment of the present invention.

FIG. 4 illustrates an example display 400 that may be generated according to the method 300. The display 400 may be presented on the display device 116, which, as noted, may be a HUD, IVI display, or other display device.

In the illustrated example, the turn path calculated at step 312 is displayed in the form of lines 402 showing one of (a) the path of the front tires of the vehicle and (b) the path followed by the sides of the vehicle at a given point. The manner in which the lines 402 are rendered based on the turn path from step 312 may be performed by relating points in an image to real world coordinates, e.g. GPS coordinates, and superimposing the turn path on the image based on that relationship. In particular, the location of a point on the path may be added to the point in the image that corresponds to that location. The image may be a current output of a forward-facing camera 106a of the vehicle. Alternatively, the image may be an output of a 360-degree camera system 106a, such as portion of such an image located in front of the vehicle. In yet another embodiment, turn path 402 and other elements of the display 400 are displayed on a HUD such that they may be viewed along with a real-world view through the windshield of the vehicle.

In some embodiments, portions of the road surface in an image from the camera 106a may be distinguished from obstacles, curbs, sidewalks, other vehicles, etc. Those portions of the path 402 that traverse currently-unoccupied areas of the road surface may be highlighted or otherwise distinguished from other portions of the path 402. As noted above, the path 402 may be updated as the vehicle moves and the relative location of obstacles changes. In response to these changes, the highlighted portion of the path 402 may also be changed to include only those portions on currently-unoccupied areas of the road surface.

The display 400 may further include an indicator 404 of a desired steering angle in order to traverse the calculated turn path. The display 400 may further include an indicator 406 of a current steering angle of the vehicle. An area between the indicators 404, 406 may be highlighted, such as by a segment having a color indicating a magnitude of the difference. For example, a red colored segment may indicate a large difference, a yellow color indicating an intermediate difference, and green indicating an acceptable difference. Values defining the boundaries for the large difference, intermediate difference, and acceptable difference may be predefined by a manufacturer and may be speed dependent, e.g. increase with decreasing speed of the vehicle.

Other possibilities for displaying a turn instruction may include text, e.g., "turn the steering wheel 15 degrees." In another example, a line may be presented with a first marker on the line indicating a current steering angle and a second marker on the line indicating the desired steering angle.

Various other items of information may be superimposed on the image from the camera 106a. For example, images of a vehicle 408 may have superimposed thereon a notification 410 including information received from that vehicle 408 by way of a V2V message, such as the vehicles current speed and intended direction or turn intent. For example, a message may include a GPS coordinate for the vehicle 408, which is then added to the portion of the image corresponding to that location. Note that many vehicles may be sending V2V messages. Accordingly, the controller may select which messages to use to render notifications or alerts. For example, those within some threshold proximity of the vehicle's path at some maximum distance in front of the vehicle.

In some embodiments, alerts 412 may be superimposed on images of potential obstacles, such as pedestrians 414, animals, or other hazards. For example, pedestrian 414 standing on the corner may potentially step into the turn path 402. Accordingly, the superimposed alert 412 may therefore instruct the driver to pay particular attention to the pedestrian 414 while traversing the turn path. Alerts 412 may also be added to potential obstacles that are not visible to the operator, such as obstacles detectable by RADAR but not otherwise visible.

Figure 5:
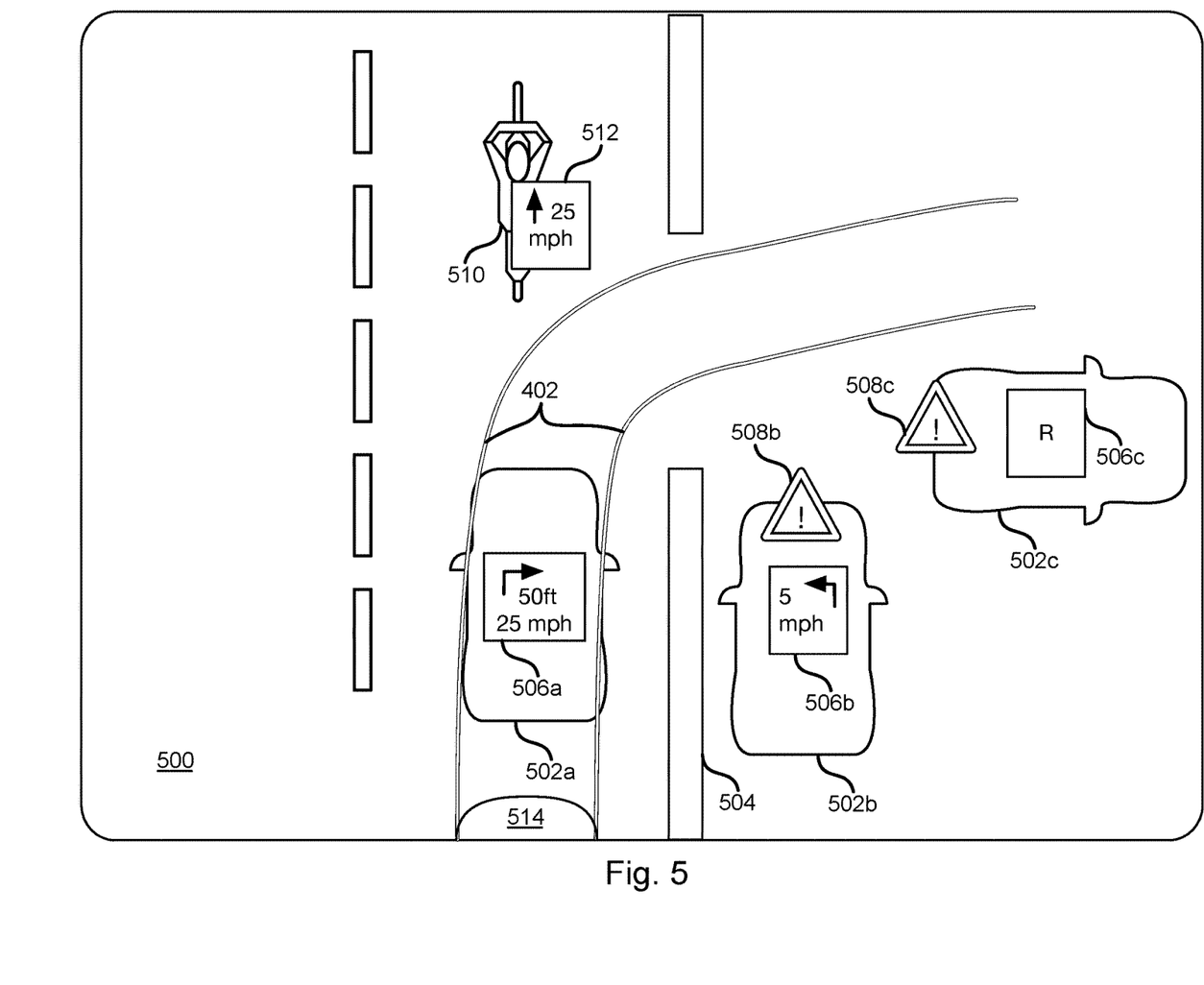
FIG. 5 is another example display of turn visualization and guidance in accordance with an embodiment of the present invention.

FIG. 5 shows another example display 500. In this example, the turn path 402 is shown from a top down perspective. The turn path 402 may be superimposed on an image of the surroundings of the vehicle from a top down perspective. The image may be obtained from various sources, such as a satellite image of a region around the vehicle based on the GPS coordinate of the vehicle, a portion of a map representing the region around the vehicle, output of a 360-degree camera system, or a composite image of cameras positioned around the vehicle and combined to form a top down view of the region surrounding the vehicle.

Representations of vehicles 502a-502c may be added to the display 500 at their locations relative to the turn path 402. In particular, the locations of the vehicles 502a-502c on the display 500 may correspond to real-world locations of the vehicles as detected by the vehicle or as reported by V2V message. In particular, vehicles 502b-502c may not be visible to the driver of the vehicle or its sensors due to a barrier 504. Accordingly, the display may add the representations 502b-502c at the locations indicated by the messages. As for the example of FIG. 4, messages may include information regarding the speed and turning intent of the sources of the message. Accordingly, notifications 506a-506c may be superimposed over the representations of corresponding vehicles 502a-502c. In some instances, a vehicle 502c is in reverse gear but is not currently moving. Accordingly, a notification from the vehicle 502c may communicate this fact and the display 500 may superimpose a representation 506c of this fact ("R") on the representation of the vehicle 502c. Where a path or potential path of a vehicle 502b, 502c has potential to interfere with the turn path 402, the display 500 may further include alerts 508b, 508c that highlights the possible interference.

As for the display 400, alerts and notifications may be selected for V2V messages based on relevance to the vehicle. For example, in the example of FIG. 5, the change of state of the vehicle 502c to reverse gear would be deemed relevant inasmuch as it now has the potential to intersect the turn path 402.

In some embodiments, a vehicle, e.g. vehicle 502a, may detect an obstacle 510 that is not detectable by the vehicle and report the location of the obstacle 510 to the vehicle using a V2V message. Accordingly, the display 500 may include a representation of the obstacle 510. The notification may further include an annotation 512, such as speed or other information concerning the trajectory of the obstacle 510 as detected by the vehicle 502a or by the obstacle itself where the obstacle 510 is a V2V enabled vehicle.

The display 500 may further include a representation of the vehicle 514 hosting the controller 102 in the image in order to enable the driver to understand the relative location of other features in the display 500. Although not shown, the display 500 may also include one or more indicators 404-406 providing a steering angle instruction in the same manner as for the display 400.

Below are examples of situations in which the display of 500 implemented according to the method 300 may be helpful:

The vehicle is following a second vehicle in traffic, and suddenly the second vehicle has to make a turn without having signaled in advance (no center lane or protected left turn). A V2V message informs the vehicle of the turn in advance due to the turn being in routing instructions being presented in the second vehicle. Accordingly, a notification (see, e.g., notifications 410, 506a-506c) may be displayed to the driver of the vehicle before the unannounced turn.

The vehicle approaches a second vehicle in opposing traffic that is stopped in the middle of the road. Will it turn? Should the vehicle slow down or speed up? A V2V message from the second could provide the vehicle with a notification of obstacles detected by sensors of the second vehicle. The driver of the vehicle may therefore proceed comfortably past the second vehicle or let the vehicle make a turn based on knowledge of these reported obstacles.

The vehicle is in a busy parking lot looking for a space. The driver switches to the overhead view of FIG. 5, i.e. a wide-search view. A nearby second vehicle starts up, and shifts into reverse gear. Because cars rarely shift into reverse during normal driving, the driver of the vehicle can assume that the second vehicle is backing out of a parking space. A V2V message from the second vehicle provides a notification of the gear change and a location of the second vehicle. This information may be displayed on the display 500 (see, e.g., vehicle 502c). This notification and the displayed turn path 402 guide the driver of the vehicle to avoid the second vehicle and execute a desired turn.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising, by a controller of a vehicle:
   receiving outputs of one or more sensors;
   identifying one or more obstacles according to the outputs of the one or more sensors;
   determining one or more paths of the one or more obstacles based at least on an object tracking technique;
   (a) determining a turn path according to locations of the one or more obstacles and the one or more paths of the one or more obstacles;

(b) presenting a visual representation of the turn path on a display device coupled to the controller for execution by a driver of the vehicle;
performing (a) and (b) in response to receiving a first indicator of turning intent from the driver of the vehicle,
wherein the first indicator of turning intent comprises at least one of:
a change in steering wheel angle;
turning on a turn signal; and
detecting a turn in navigation data for a route selected by the driver,
wherein (b) further comprises:
detecting a current steering angle of the vehicle;
determining a desired steering angle according to the turn path; and
displaying a second indicator of a difference between the current steering angle and the desired steering angle; and
selecting a color for the second indicator according to a magnitude of the difference between the current steering angle and the desired steering angle, wherein the color for the second indicator is selected based on a set of predefined boundaries for the magnitude, and wherein the set of predefined boundaries for the magnitude varies based at least in part on a speed of the vehicle.

2. The method of claim 1, wherein the one or more sensors include at least one of a camera, a light detection and ranging (LIDAR) sensor, and a radio detection and ranging (RADAR) sensor.

3. The method of claim 1, wherein the vehicle is a first vehicle, further comprising:
receiving a message from a second vehicle over a vehicle-to-vehicle (V2V) communication protocol;
obtaining an additional obstacle location from the message;
obtaining a set of vehicle properties of the first vehicle, wherein the set of vehicle properties comprises at least a vehicle width, a vehicle length, a vehicle wheelbase size, a vehicle turning radius, and at least one vehicle turning dynamic; and
performing (a) according to the one or more obstacles, the additional obstacle, and the set of vehicle properties.

4. The method of claim 3, wherein the additional obstacle is an obstacle detected by a sensor of the second vehicle, and wherein (a) is performed according to the one or more obstacles and the additional obstacle based at least in part on the additional obstacle being within a threshold proximity of a path of the first vehicle at a maximum distance in front of the first vehicle.

5. The method of claim 3, further comprising:
determining an intended path of the second vehicle; and
performing (a) effective to avoid the intended path of the second vehicle.

6. The method of claim 3, wherein presenting the visual representation of the turn path on the display device comprises presenting the turn path from a top-down perspective, the visual representation further including a visual representation of the additional obstacle, the additional obstacle being out of a field of view of the driver.

7. A system comprising one or more processing devices and one or more memory devices operably coupled to the one or more processing devices, the one or more memory devices storing executable code effective to cause the one or more processing devices to:

receive outputs of one or more sensors;
identify one or more obstacles according to the outputs of the one or more sensors;
determine one or more paths of the one or more obstacles based at least on an object tracking technique;
(a) determine a turn path according to locations of the one or more obstacles and the one or more paths of the one or more obstacles; and
(b) present a visual representation of the turn path on a display device coupled to the controller for execution by a driver of the vehicle;
perform (a) and (b) in response to receiving a first indicator of turning intent from the driver of the vehicle,
wherein the first indicator of turning intent comprises at least one of:
a change in steering wheel angle;
turning on a turn signal; and
detecting a turn in navigation data for a route selected by the driver,
wherein the executable code is further effective to cause the one or more processing devices to perform (b) by:
detecting a current steering angle of the vehicle;
determining a desired steering angle according to the turn path; and
displaying a second indicator of a difference between the current steering angle and the desired steering angle; and
display a color on the second indicator according to a magnitude of the difference between the current steering angle and the desired steering angle, wherein the color on the second indicator is further based on a set of predefined boundaries for the magnitude, and wherein the set of predefined boundaries for the magnitude varies based at least in part on a speed of the vehicle.

8. The system of claim 7, wherein the one or more sensors include at least one of a camera, a light detection and ranging (LIDAR) sensor, and a radio detection and ranging (RADAR) sensor.

9. The system of claim 7, wherein the vehicle is a first vehicle, and wherein the executable code is further effective to cause the one or more processing devices to:
receive a message from a second vehicle over a vehicle-to-vehicle (V2V) communication protocol;
obtain an additional obstacle location from the message;
obtain a set of vehicle properties of the first vehicle, wherein the set of vehicle properties comprises at least a vehicle width, a vehicle length, a vehicle wheelbase size, a vehicle turning radius, and at least one vehicle turning dynamic; and
perform (a) according to the one or more obstacles, the additional obstacle, and the set of vehicle properties.

10. The system of claim 9, wherein the additional obstacle is an obstacle detected by a sensor of the second vehicle, and wherein (a) is performed according to the one or more obstacles and the additional obstacle based at least in part on the additional obstacle being within a threshold proximity of a path of the first vehicle at a maximum distance in front of the first vehicle.

11. The system of claim 9, wherein the executable code is further effective to cause the one or more processing devices to:
determine an intended path of the second vehicle; and
perform (a) effective to avoid the intended path of the second vehicle.

12. The system of claim 9, wherein the executable code is further effective to cause the one or more processing devices to present the visual representation of the turn path on the display device by presenting the turn path from a top-down perspective, the visual representation further including a visual representation of the additional obstacle, the additional obstacle being out of a field of view of the driver.

* * * * *